United States Patent
Masakawa

(10) Patent No.: US 9,482,093 B2
(45) Date of Patent: Nov. 1, 2016

(54) IMPELLER, IMPELLER CUTTING JIG, AND METHOD OF MACHINING IMPELLER

(71) Applicant: FANUC Corporation, Yamanashi (JP)

(72) Inventor: Takashi Masakawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 78 days.

(21) Appl. No.: 14/525,387

(22) Filed: Oct. 28, 2014

(65) Prior Publication Data

US 2015/0125303 A1 May 7, 2015

(30) Foreign Application Priority Data

Nov. 1, 2013 (JP) ................................. 2013-228717

(51) Int. Cl.
| | | |
|---|---|---|
| *F01D 5/04* | (2006.01) | |
| *B23P 15/02* | (2006.01) | |
| *F04D 17/08* | (2006.01) | |
| *F04D 29/28* | (2006.01) | |
| *B23P 15/00* | (2006.01) | |
| *F01D 5/02* | (2006.01) | |

(52) U.S. Cl.
CPC ............. *F01D 5/048* (2013.01); *B23P 15/006* (2013.01); *B23P 15/02* (2013.01); *F04D 17/08* (2013.01); *F04D 29/28* (2013.01); *F04D 29/284* (2013.01); *F01D 5/025* (2013.01); *F05D 2230/64* (2013.01); *Y10T 29/37* (2015.01); *Y10T 29/49316* (2015.01)

(58) Field of Classification Search
CPC ...... F01D 5/048; F01D 5/025; F04D 29/284; F04D 29/28; F04D 17/08; B23P 15/02; B23P 15/006; Y10T 29/37; Y10T 29/49316; F05D 2230/64
See application file for complete search history.

(56) References Cited

U.S. PATENT DOCUMENTS

| | | | |
|---|---|---|---|
| 2007/0039709 A1 | 2/2007 | Endo et al. | |
| 2008/0142050 A1* | 6/2008 | Hashish | B24C 3/325 134/22.12 |
| 2010/0166519 A1 | 7/2010 | Leitold | |
| 2013/0199042 A1 | 8/2013 | Prust et al. | |

FOREIGN PATENT DOCUMENTS

| | | |
|---|---|---|
| JP | 44-30241 Y1 | 12/1969 |
| JP | 2007-50444 A | 3/2007 |
| JP | 2011-64089 A | 3/2011 |
| JP | 2011-513077 A | 4/2011 |

OTHER PUBLICATIONS

Office Action mailed Jan. 13, 2015, corresponding to Japanese patent application No. 2013-228717.

* cited by examiner

*Primary Examiner* — Moshe Wilensky
(74) *Attorney, Agent, or Firm* — Hauptman Ham, LLP

(57) ABSTRACT

Provided is an impeller in which a through hole is provided in a center of a base member of the impeller and a plurality of recessed parts are formed on a bottom surface of the base member. Meanwhile, a jig using in a cutting work of the impeller includes a seating part having a seating surface, a shaft part is erected from a central part of the seating part and is engageable with the through hole of the impeller, and protruded parts are formed on the seating surface and are engageable with the recessed parts provided on the base-member bottom surface of the impeller.

7 Claims, 4 Drawing Sheets

2

3

IMPELLER, IMPELLER CUTTING JIG, AND METHOD OF MACHINING IMPELLER

RELATED APPLICATIONS

The present application claims priority to Japanese Application Number 2013-228717, filed Nov. 1, 2013, the disclosure of which is hereby incorporated by reference herein in its entirety.

BACKGROUND OF THE INVENTION

1. Field of the Invention

The present invention relates to a method of machining an impeller, in which a cutting work can be performed with high efficiency, an impeller, and an impeller cutting jig.

2. Description of the Related Art

In recent years, a case where an impeller to be used in an automobile or an air conditioner is shaped using a cutting work is increasing. In a cutting work of the impeller, there are many cases of using a cutting tool having a large diameter or increasing a cutting speed so as to efficiently perform the cutting work and to shorten machining time, in particular, at a stage of rough work prior to a finish work. In order to use the cutting tool having a large diameter or increase the cutting speed in the cutting work of the impeller, it is necessary to fix a workpiece to a cutting jig in a way to withstand a large cutting load.

Japanese Patent Application Laid-Open No. 2011-513077 discloses a technique in which a workpiece is placed on a cutting jig, the workpiece is pressed against the jig from the top in an axial direction of a hole formed in a central part of the workpiece, and then the workpiece is fixed to the jig. In this technique, preferably, the workpiece is pressed against the jig over a wide range in order to firmly fix the workpiece to the jig.

However, in general, an upper part of the impeller (workpiece) has a wide machining range in many cases. If the workpiece is pressed over the wide range, possibly the cutting tool for machining interferes with the jig.

On the contrary, in order to avoid the interference between the cutting tool and the jig, when the workpiece is pressed in a narrow range near the center, there is a concern that rotational deviation may occur in the workpiece due to the cutting load, a machining defect of the workpiece may occur due to influence of the rotational deviation, or a damage to the cutting tool may occur. Therefore, in order to prevent the occurrence of the rotational deviation, there is a method of decreasing a machining speed or increasing a pressing force from the top.

However, when the machining speed is decreased, the machining requires much time and thus machining efficiency is reduced. In addition, there is a limitation in increasing the pressing force from the top, and when the pressing force is forcibly increased, there is also a concern that unexpected deformation of the workpiece may occur or desired performance of the impeller may not be obtained.

SUMMARY OF THE INVENTION

Accordingly, an object of the invention is to provide an impeller, which can be firmly fixed to the cutting jig with a simple configuration so as to improve machining efficiency and to reduce deterioration of a balance or a risk of a fracture, an impeller cutting jig, and a method of machining an impeller.

The impeller according to the invention includes a base member configured to have a through hole in a rotation center of the base member and a plurality of blades configured to protrude from a front surface of the base member and provided on a circumference around the rotation center. Moreover, on a rear surface of the base member, a plurality of recessed parts or a plurality of protruded parts are formed at positions of a rotational symmetry around the rotation center and at positions other than regions in which root portions of the blades are projected onto the rear surface of the base member.

According to the impeller, a plurality of recessed parts are provided on the rear surface of the base member, the recessed parts are engaged with protruded parts provided on a seating surface of the cutting jig, and thus it is possible to firmly fix the impeller (workpiece) to the cutting jig without applying excessive force to the impeller and to suppress unexpected deformation of the impeller.

The impeller cutting jig according to the invention includes a seating part configured to have a seating surface and a shaft part configured to be erected from a central part of the seating part and capable of being engaged with a through hole formed in a rotation center of an impeller. Moreover, on the seating surface of the seating part, a plurality of protruded parts or a plurality of recessed parts are provided at positions of a rotational symmetry around the shaft part and are engageable with recessed parts or protruded parts provided on a rear surface of a base member of the impeller.

According to the impeller cutting jig, a plurality of protruded parts are provided on the seating surface and are engaged with the recessed parts provided on the rear surface of the base member of the impeller, and thus it is possible to provide the impeller cutting jig capable of firmly fixing the impeller.

In the method of machining the impeller according to the invention, the impeller includes a base member configured to have a through hole engaging with a shaft part of a jig and a plurality of blades configured to protrude from a front surface of the base member and provided in a circumferential direction, wherein, on a rear surface of the base member, a plurality of recessed parts or a plurality of protruded parts are formed at positions of a rotational symmetry around the through hole and at positions other than regions in which root portions of the blades are projected onto the rear surface of the base member, and the method of machining the impeller includes step of performing a cutting work on the impeller in a state where the impeller is fixed to a cutting jig in which protruded parts or recessed parts are formed on a seating surface to be engaged with the recessed parts or the protruded parts of the base member.

According to the method of machining the impeller, a plurality of recessed parts provided on the rear surface of the base member of the impeller are engaged with the protruded parts provided on the seating surface of the cutting jig and thus the impeller and the cutting jig can be firmly fixed to each other. Accordingly, it is possible to increase cutting efficiency without deteriorating the performance of the impeller.

According to the invention, it is possible to provide the impeller, which can be firmly fixed to the cutting jig with the simple configuration so as to improve the machining efficiency and to reduce the deterioration of the balance or the risk of the fracture, the impeller cutting jig, and the method of machining the impeller.

BRIEF DESCRIPTION OF THE DRAWINGS

The above and other objects and features of the present invention will be apparent from the following description of embodiments with reference to the accompanying drawings, in which.

DETAILED DESCRIPTION OF THE PREFERRED EMBODIMENTS

Figure 1:
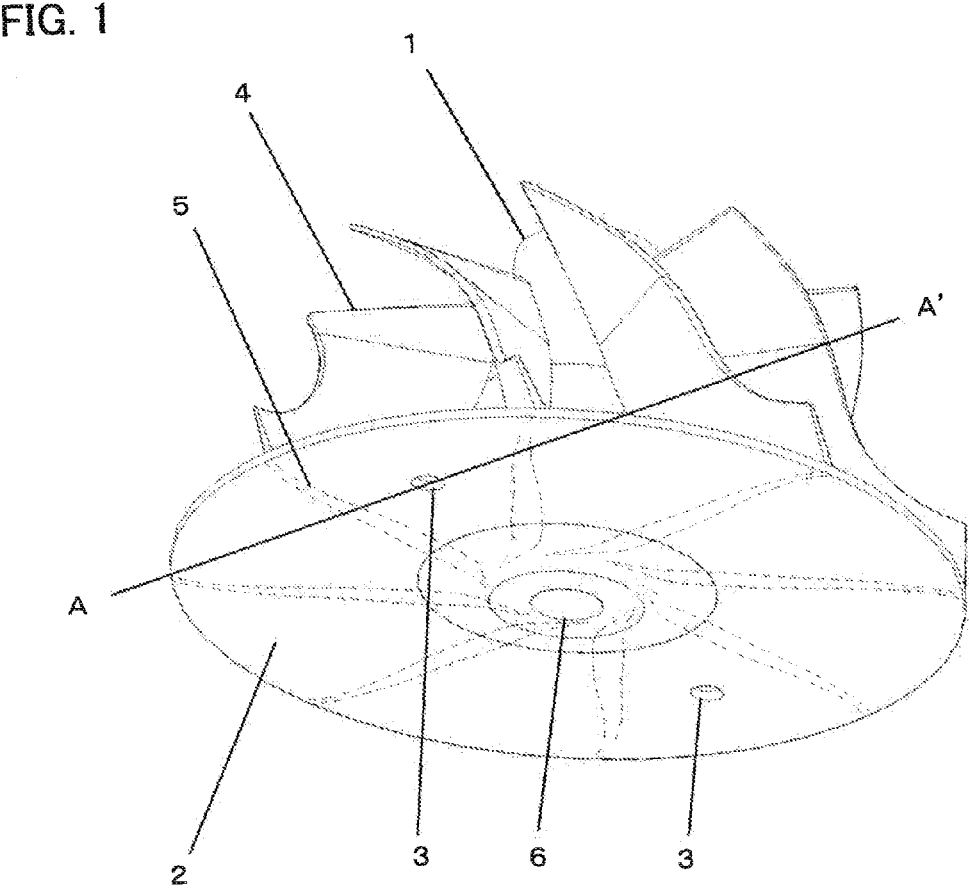
FIG. 1 is a diagram illustrating an impeller according to an embodiment of the invention.

An impeller according to an embodiment of the invention will be described with reference to FIGS. 1 and 2.

The impeller (workpiece) has a through hole 6 at the center thereof and is configured of a base member 1 having a shape in which an upper part is narrow and a lower part is wide and a plurality of blades 4 which protrude from a front surface of the base member 1 and are provided at equal intervals on a circumference around the through hole 6. A bottom part of the base member 1 (base-member bottom part) has a cross section of an approximately circular shape, and two recessed parts 3 are formed on a bottom surface of the base member (base-member bottom surface 2) so as to be located on mutually opposite sides across the center.

In general, it is preferable that the impeller have the center of gravity (center of mass) at a rotation center in order to use with a high-speed rotation in a stable manner. Therefore, in the case of providing a plurality of recessed parts 3 on the bottom surface 2 of the base-member bottom part having the cross section of the approximately circular shape, the recessed parts 3 are formed at positions to be rotational symmetry with respect to each other, respectively (arranged such that angles formed by the recessed parts 3 adjacent to each other are equal), and thus it is possible to hold the center of gravity of the impeller at the rotation center of the impeller. The recessed parts 3 have the circular shapes in cross section as illustrated in FIG. 1, but may have other shapes such as a polygonal shape or an oval shape in cross section without being limited thereto.

With respect to an cross-sectional area or a depth, when the recessed parts 3 are formed to be too small, it is difficult to be firmly engaged with a cutting jig (described later), however, when the recessed parts 3 are formed to be too large, on the other hands, strength of the workpiece is reduced, as a result, a fracture may occur in the workpiece at the time of machining. For this reason, preferably, the cross-sectional area or depth of the recessed parts 3 is determined by analysis and experiments in advance so as to maintain required strength in consideration of use conditions of the impeller.

Figure 2:
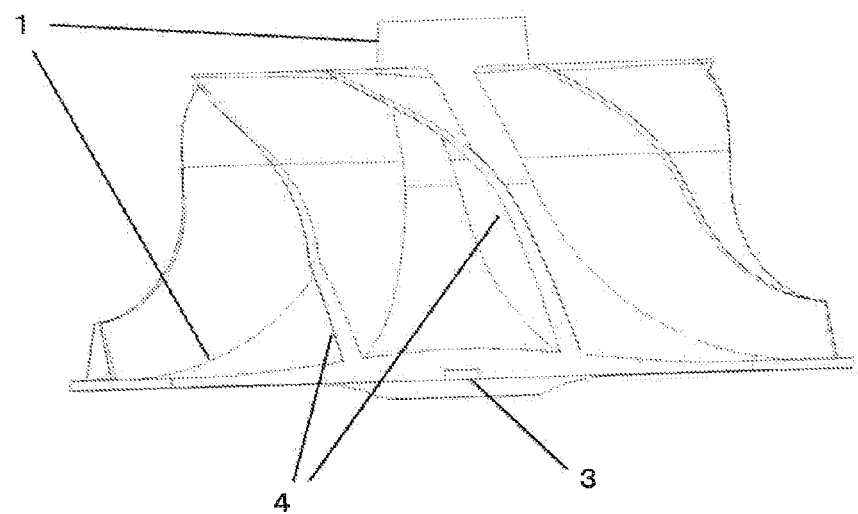
FIG. 2 is a cross-sectional view taken along line A-A' in FIG. 1.

In addition, as illustrated in FIGS. 1 and 2, the recessed parts 3 are formed in regions other than regions (forming prohibition areas 5 illustrated in FIG. 1) in which root portions of the blades 4 are projected onto the base-member bottom surface 2. During the high-speed rotation of the impeller, a large load is applied to the root portions of the blades 4, and thus the fracture easily occurs. Therefore, when the regions in which the blades 4 are formed are overlapped with the regions in which the recessed parts 3 are formed, the strength of the root portions of the blades 4 is reduced, and thus the fracture can occur. As illustrated in FIG. 1, when the recessed parts 3 are formed in the regions other than the regions (forming prohibition areas 5) in which the root portions of the blades 4 are projected onto the base-member bottom surface 2, it is possible to prevent the strength of the blades 4 from being reduced by the formation of the recessed parts 3.

An impeller cutting jig to be used in cutting the workpiece of the impeller will be described below with reference to FIG. 3.

An impeller cutting jig 10 is configured of a disc-shaped seating part 14 and a shaft part 13 erected from the center of the seating part 14, and a top surface of the seating part 14 becomes a seating surface 11. A plurality (two in FIG. 3) of protruded parts 12 are provided on the seating surface 11.

Figure 3:
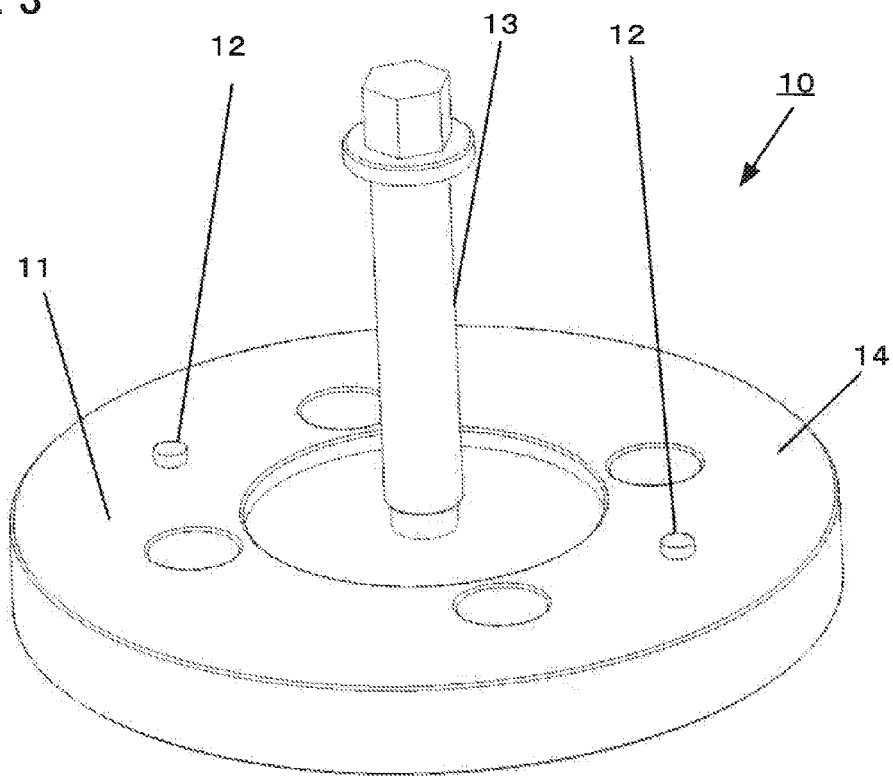
FIG. 3 is a diagram illustrating an impeller cutting jig, which is used in cutting the impeller (workpiece), according to an embodiment of the invention.
Figure 4:
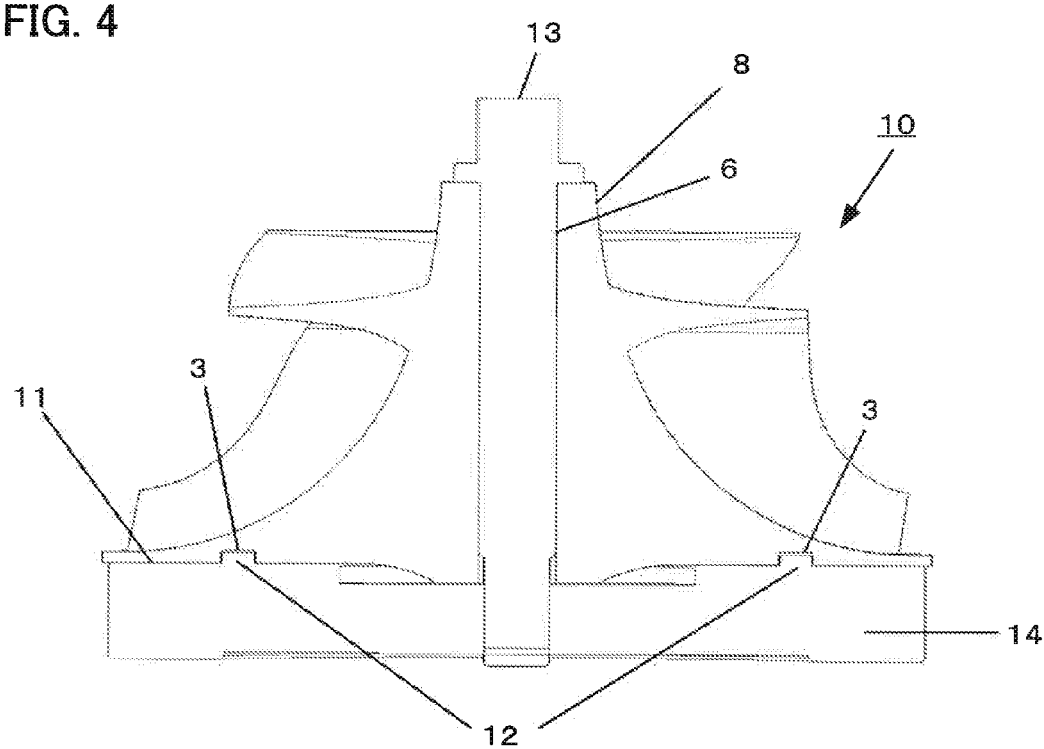
FIG. 4 is a diagram illustrating a state where the workpiece of the impeller illustrated in FIG. 1 is attached to the impeller cutting jig illustrated in FIG. 3.

FIG. 4 is a diagram illustrating a state where the workpiece of the impeller illustrated in FIG. 1 is attached to the impeller cutting jig illustrated in FIG. 3.

The shaft part 13 of the impeller cutting jig 10 is inserted into the through hole 6 of the workpiece such that the base-member bottom surface 2 of the workpiece is overlapped with the seating surface 11 of the impeller cutting jig 10. In addition, at this time, the recessed parts 3 provided on the base-member bottom surface 2 are engaged with the protruded parts 12 provided on the seating surface 11 of the impeller cutting jig 10. By the engagement of the protruded parts 12 with the recessed parts 3, the workpiece and the impeller cutting jig 10 are firmly fixed to each other even though an excessive force is not applied to the workpiece from the upper part.

Since the protruded parts 12 provided on the seating surface 11 of the impeller cutting jig 10 serve to engage with the recessed parts 3 provided on the base-member bottom surface 2 of the workpiece, the protruded parts are formed at positions to be rotational symmetry with respect to each other, as in the case of the recessed parts 3 on the base-member bottom surface 2. Further, preferably, the number of the protruded parts 12 of the impeller cutting jig 10 is the same as the number of the recessed parts 3 provided on the impeller, but may be configured to be less than the number of the recessed parts 3 such that the recessed parts 3 have the excessive number.

At the time of machining the workpiece of the impeller, the shaft part 13 of the impeller cutting jig 10 is inserted into the through hole 6 formed at the center of the workpiece so that the base-member bottom surface 2 of the workpiece is overlapped with the seating surface 11 of the impeller cutting jig 10. At this time, the protruded parts of the impeller cutting jig 10 are engaged with the recessed parts 3 of the workpiece.

After the workpiece is fixed to the impeller cutting jig 10 in this manner, the impeller cutting jig 10 and the workpiece are integrally rotated at a high speed, and thus the impeller is formed by performing a cutting work on the workpiece using a machine tool or the like.

Figure 5:
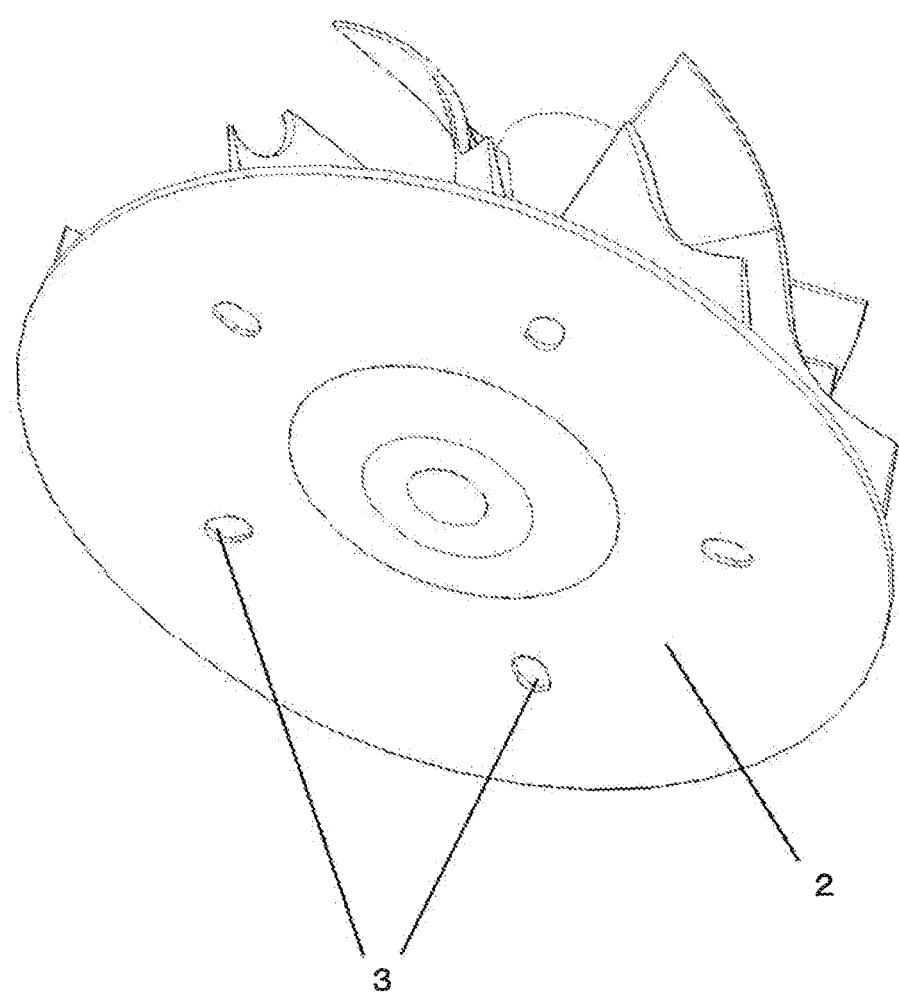
FIG. 5 is a diagram illustrating a first example of a shape of the recessed parts 3 provided on the base-member bottom surface 2 of the impeller, which is different from the shape (circular cross-sectional shape) of recessed parts 3 provided on a base-member bottom surface 2 of the impeller in FIG. 1.
Figure 6:
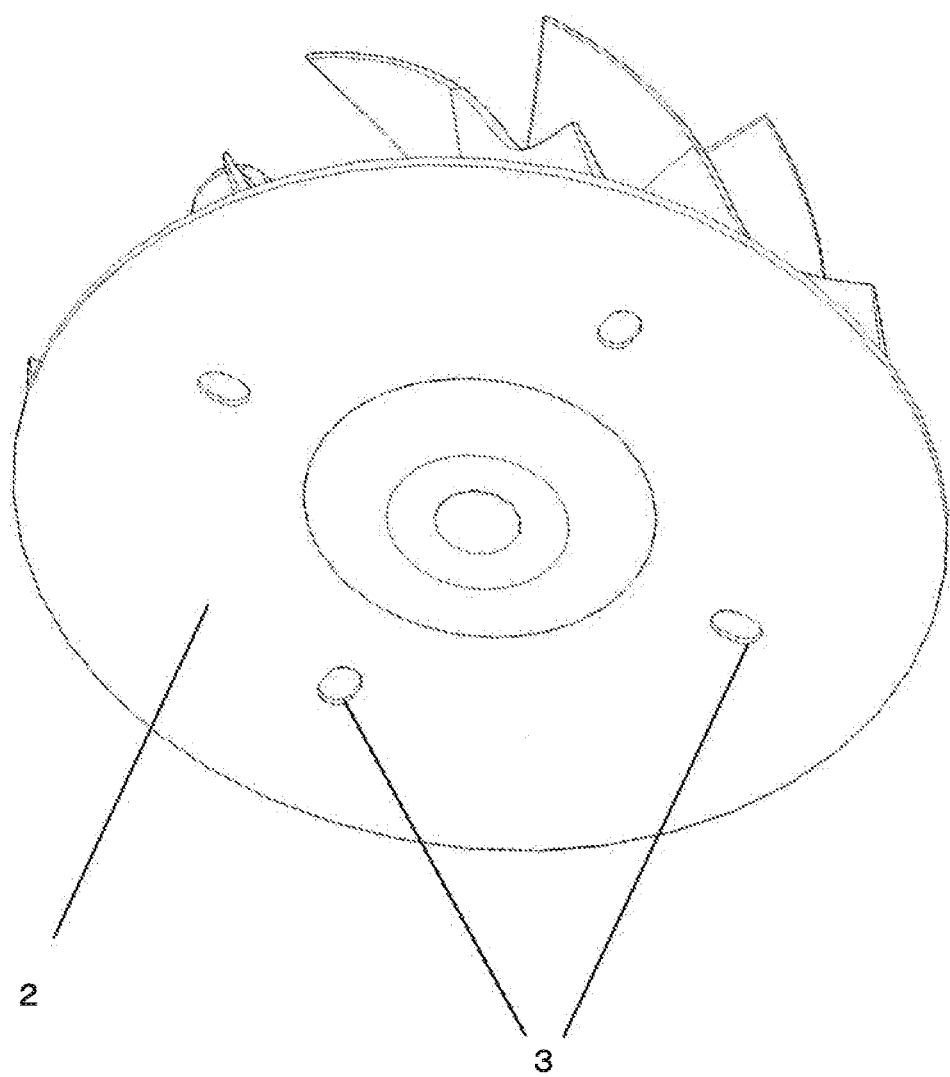
FIG. 6 is a diagram illustrating a second example of a shape of the recessed parts 3 provided on the base-member bottom surface 2 of the impeller, which is different from the shape (circular cross-sectional shape) of the recessed parts 3 provided on the base-member bottom surface 2 of the impeller in FIG. 1.

FIGS. 5 and 6 are diagrams illustrating shapes of the recessed parts 3 provided on the base-member bottom surface 2 of the impeller, respectively, which are different from the shapes (circular cross-sectional shapes) of the recessed parts 3 provided on the base-member bottom surface 2 of the impeller in FIG. 1.

Five recessed parts 3 are formed in an elongate hole shape in an example illustrated in FIG. 5, and four recessed parts 3 are formed in an elongate hole shape in an example illustrated in FIG. 6. Even in either case of examples, since the recessed parts 3 are formed at positions to be rotational symmetry with respect to each other, respectively (arranged such that angles formed by the recessed parts 3 adjacent to each other are equal), even when the recessed parts 3 are provided at the base-member bottom part 2 of the workpiece of the impeller, it is possible to hold the center of gravity at the rotation center of the workpiece.

Further, the embodiment of the invention described with reference to FIGS. 1 to 6 is configured in such a manner that the recessed parts 3 are provided on the base-member bottom surface 2 of the impeller and the protruded parts 12 are provided on the seating surface 11 of the impeller cutting jig 10, but conversely, the protruded parts are provided on the base-member bottom surface 2 of the impeller and the recessed parts are provided on the seating surface 11 of the impeller cutting jig 10, and thus the protruded parts and the recessed parts can be configured to be engaged with each other. Moreover, both the recessed parts and the protruded parts may be provided on a rear surface of the base member of the impeller and both the protruded parts and the recessed parts may also be provided on the seating surface 11 of the impeller cutting jig 10 so as to respectively correspond to the recessed parts and the protruded parts of the rear surface of the base member of the impeller, and thus the protruded parts and the recessed parts can be configured to be engaged with each other.

The invention claimed is:

1. A method of machining an impeller, wherein
the impeller includes:
a base member configured to have a through hole engaging with a shaft part of a jig and configured to be rotatably attachable;
a plurality of blades configured to protrude from a front surface of the base member and provided in a circumferential direction, and
a plurality of recessed parts or a plurality of protruded parts that are formed, on a rear surface of the base member, at positions of a rotational symmetry around the through hole and at positions other than regions in which root portions of the blades are projected onto the rear surface of the base member, and
the method of machining the impeller includes step of:
performing a cutting work on the impeller in a state where the impeller is fixed to a cutting jig in which protruded parts or recessed parts are formed on a seating surface to be engaged with the recessed parts or the protruded parts of the base member.

2. The method of claim 1, wherein the recessed parts are on the impeller and the protruded parts are on the jig.

3. The method of claim 1, wherein each of the impeller and the jig includes both recessed and protruded parts.

4. The method of claim 1, wherein the recessed parts are elongated in shape.

5. The method of claim 1, wherein the recessed parts are polygonal in shape.

6. The method of claim 1, wherein the recessed parts are non-circular in shape.

7. The method of claim 1, wherein the recessed parts are oval-shaped.

* * * * *